May 16, 1950 W. E. MESH 2,507,863
RAIL FLAW DETECTOR MECHANISM
Filed March 9, 1948

INVENTOR.
WILLIAM E. MESH
BY
Joseph H. Lipschutz
ATTORNEY

Patented May 16, 1950

2,507,863

UNITED STATES PATENT OFFICE 2,507,863

RAIL FLAW DETECTOR MECHANISM

William E. Mesh, Teaneck, N. J., assignor to Sperry Products, Inc., Hoboken, N. J., a corporation of New York Application March 9, 1948, Serial No. 13,752

1 Claim. (Cl. 346—33)

This invention relates to rail flaw detector mechanisms of the type now employed on Sperry rail flaw detector cars. These cars run along the railroad tracks and pass current continuously through the rails between spaced contact brushes to set up an electromagnetic field surrounding the rail. Flaws in the rail caused by fissures are discovered by reason of the fact that they set up non-uniform regions in the said electromagnetic field. Such non-uniformities are detected by means of opposed induction coils maintained at a constant distance above the railhead, the coils normally cutting a constant number of lines of force, but on encountering a region of flaw, they cut a different number of lines of force to generate a differential E. M. F. which, after being suitably amplified, may be caused to operate indicating means.

In the Sperry rail flaw detector car a plurality of such pairs of induction coils are employed for each rail and each pair of coils operates through a separate channel of an amplifier whose output operates its respective pen on a moving chart. Thus, if two pairs of coils are employed for each rail, there would be four pens drawing four lines on the chart. In addition, there are two pens indicating low current in the respective rails so that at all times the operator who is watching the chart must observe six or more lines being drawn by as many pens. Any notches in the lines being drawn by the pens operated by the induction coils may indicate a fissure in the rail, while notches in the low current pens may indicate either the presence of a rail joint or low current in the respective rail—a condition which must be corrected for proper testing. It can readily be understood that an operator is under severe tension watching such a large number of pens and the indications produced by them. Frequently, there are man failures in testing due to fatigue of the operator in watching so many pen lines, and thus occasionally fissures are missed by the operator although they are detected by the mechanism.

It is the principal object of this invention, therefore, to provide an arrangement and construction whereby the number of pen lines on the chart will be substantially reduced without reducing the information supplied by the larger number of pen lines heretofore employed.

In the Sperry rail flaw detector car it is customary to provide a detector unit wherein certain pairs of detector coils cooperate with the respective sides of the railhead. Heretofore it was impossible to determine which detector coils responded, or responded more strongly, to the fissures in the rail head. It is one of the objects of this invention not only to provide a substantial reduction in the number of pen lines drawn on the chart, but at the same time to cause the reduced number of pen lines to provide more information than was heretofore supplied by the larger number of lines, i. e., to indicate the pair of coils which gives the greater response at the side of the railhead corresponding to the location of the fissure.

Further objects and advantages of this invention will become apparent in the following detailed description thereof.

In the accompanying drawings.

Figure 1:
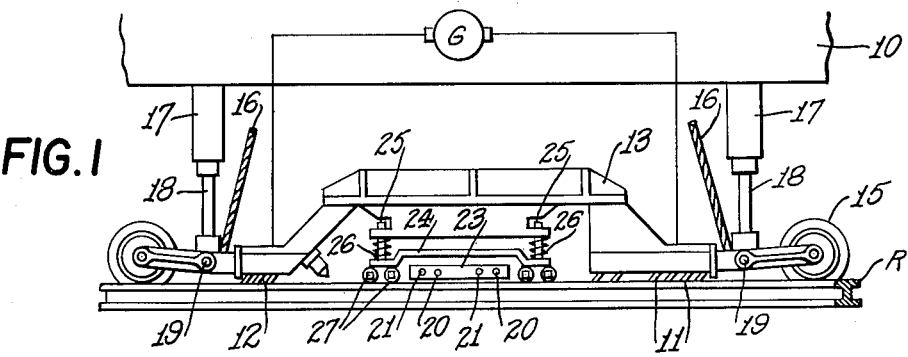
Fig. 1 is a side view of a portion of a Sperry rail fissure detector car having my invention applied thereto.
Figure 2:
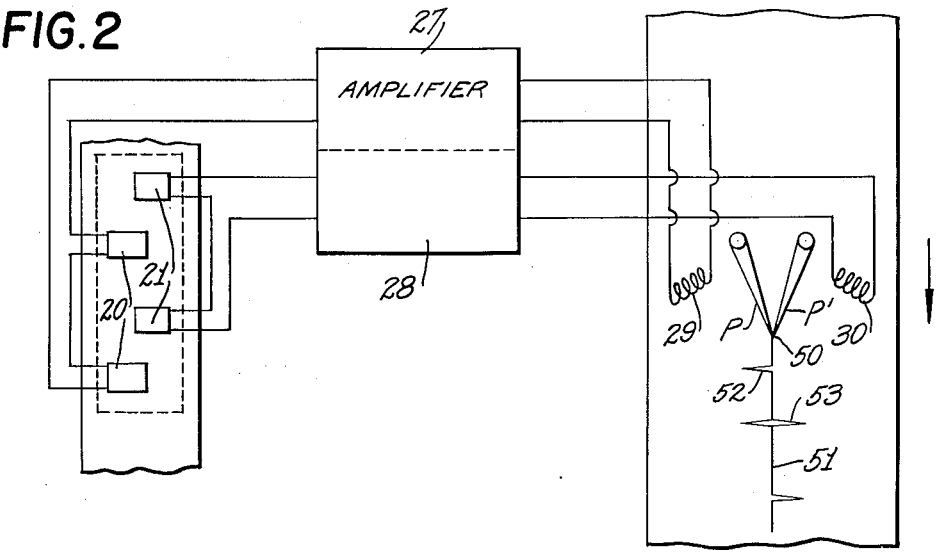
Fig. 2 is a view consisting mainly of wiring diagram illustrating the principle of this invention.

Referring to Fig. 1 of the drawings, there are shown the parts of a standard Sperry rail fissure detector car which includes a car body 10 operating along the rails R. Fissure detection is accomplished by passing current through each rail from a generator G within the car body supplying current to spaced current brushes 11 and 12 supported upon the current brush carriage 13 which, when in lowered or effective position, is adapted to ride upon the rail by means such as wheels 15. The current brush carriage 13 is normally held in elevated or ineffective position by means of springs (not shown) and cables 16, but when it is desired to lower said carriage, fluid pressure such as compressed air is applied to the cylinders 17 to force out pistons 18 which are pivotally connected at 19 to the current brush carriage 13. The current passed through the rail by way of spaced brushes 11 and 12 will establish an electromagnetic field surrounding the rail and this field will be uniform except in the region of flaw where it will be distorted. Such distortions of the electromagnetic field are detected by a flaw responsive mechanism which may take the form of pairs of opposed induction coils 20 and 21 supported in a housing 23 at a constant distance above the rail surface by means of a carriage 24. Said carriage 24 is mounted on current brush carriage 13 by means of loosely fitting bolts 25 and springs 26 to permit the carriage 24, while riding on the rail on means such as wheels 27, to move independently of carriage 13 so that said carriage 24 may at all times maintain parallelism with the rail surface regardless of irregularities thereof.

The flaw responsive mechanism may include a plurality of pairs of coils, two such pairs 20 and 21 being shown in the present instance. One pair is shown as cooperating with the gage side of the railhead while the other pair is shown as cooperating with the outside of the railhead so that each pair will be mainly responsive to the fissures in the respective side of the head. Each pair of coils is connected in series and oppositely wound so that variations in flux such as variations in the current supply or equal variations in the distance of the coils above the rail will affect both equally and oppositely, and thus will not affect the flaw detection. On entering a region of flaw, however, first one and then the other of the coils of each pair will cut a different number of lines of force from that which was previously cut to generate a differential E. M. F. The E. M. F.'s generated by each pair of coils may be amplified by separate amplifiers or by separate channels 27, 28 of one amplifier and the separate outputs of said amplifiers may be caused to energize coils 29 and 30 to attract their armatures in the form of pens P and P'.

Figure 3:
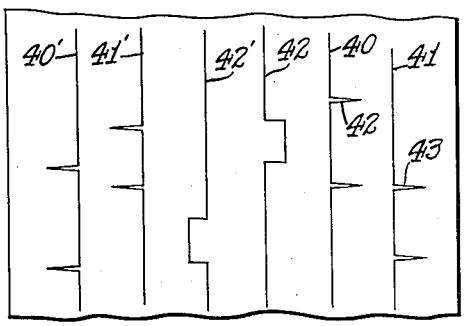
Fig. 3 is a view of a portion of a record tape such as is employed on a rail fissure detector car.

Heretofore, the arrangement was such that said pens P and P' were similarly arranged to draw two parallel lines as shown in Fig. 3 at 40 and 41 and were actuated in the same direction so that when a differential E. M. F. was generated by the respective pair of coils in response to a fissure, similar notches 42, 43 were made by the two pens in the same direction. As pointed out in the introduction hereto, these pen lines were duplicated for the other rail at 40' and 41', and in addition there was low current indication upon lines 42 and 42' so that six or more lines were being drawn at one time on the record tape which runs continuously before the eyes of the operator. The difficulty in watching these lines and the fatigue which resulted therefrom can readily be understood.

By this invention I provide for a reduction in the number of lines, while at the same time increasing the amount of information imparted thereby. For this purpose I position the pens P and P' and their operating coils 29 and 30 so that the pens P and P' converge to substantially the same point 50 at their writing ends whereby normally the two pens draw a single line 51 which may be perhaps slightly thicker than the line which one pen alone would draw. The pen P which is actuated by coil 29 in response to the pair of coils at the left side of the railhead is pivoted to be actuated to the left in response to the fissure picked up by coils 20 as shown at 52, while the pen P' is pivoted to be drawn to the right to make a mark 53 in response to a fissure picked up mainly by the coils 21 at the right hand side of the rail. Thus, while the two pens normally draw but a single line, they impart more information in response to fissures than in the Fig. 3 form wherein they drew separate lines and were similarly actuated, because by this arrangement a notch in the line to the left means that the fissure has been picked up by the pair of coils at the left side of the railhead, while a notch toward the right means that the fissure has been picked up by the pair of coils at the right hand side of the railhead. Thus, if there is one notch, the direction of the notch gives a graphic indication of the general location of the fissure in the railhead. If the notch appears on both sides of the line corresponding to simultaneous actuation of both pens, then, of course, the fissure is substantially symmetrically located with respect to both pairs of coils. Thus, the six pens of Fig. 3 can now be reduced to four pens, and not only is the chart now easier to observe with less fatigue to the operator, but information is more readily obtained as to the general location of the fissure in the railhead section than was heretofore obtained by the larger number of pen lines.

Having described my invention, what I claim and desire to secure by Letters Patent is:

In a rail flaw detector system having pick-ups cooperating with the gauge side and the outside of the rail head, recorder means comprising: a chart, means for supporting and moving the chart, two pens mounted adjacent to and in contact with the chart and which, in the absence of actuation, have their marking points substantially in contact with each other so that normally they draw a single line in the direction of movement of the chart, and two separate means responsive to the outputs of the two pick-ups for actuating said pens independently and in opposite directions from the normal line whereby the pens draw independent, non-overlapping indications relating to the gauge side and the outside of the rail head respectively.

WILLIAM E. MESH.

REFERENCES CITED

The following references are of record in the file of this patent:

UNITED STATES PATENTS

| Number | Name | Date |
|---|---|---|
| 993,437 | Cole | May 30, 1911 |
| 1,427,181 | Westling | Aug. 29, 1922 |
| 1,820,505 | Sperry | Aug. 25, 1931 |
| 2,325,451 | Wait | July 27, 1943 |